US012431639B2

(12) United States Patent
Silverman

(10) Patent No.: US 12,431,639 B2
(45) Date of Patent: Sep. 30, 2025

(54) ELECTRICAL FEED THROUGH CONNECTOR

(71) Applicant: Louis Silverman, Levittown, PA (US)

(72) Inventor: Louis Silverman, Levittown, PA (US)

(73) Assignee: Rocal Corporation, Warrington, PA (US)

( * ) Notice: Subject to any disclaimer, the term of this patent is extended or adjusted under 35 U.S.C. 154(b) by 203 days.

(21) Appl. No.: 18/138,292

(22) Filed: Apr. 24, 2023

(65) Prior Publication Data

US 2024/0356250 A1 Oct. 24, 2024

(51) Int. Cl.
*H01R 11/03* (2006.01)
*H01R 4/30* (2006.01)
*H01R 11/12* (2006.01)

(52) U.S. Cl.
CPC ............. *H01R 11/03* (2013.01); *H01R 4/305* (2013.01); *H01R 11/12* (2013.01)

(58) Field of Classification Search
CPC .... H01R 4/305; H01R 4/308; H01R 4/30–34; H01R 4/38; H01R 4/64; H01R 4/56–62; H01R 4/00; H01R 11/03; H01R 11/12; H01R 11/01; H01R 11/14; H01R 11/15; H01R 11/26; H01R 11/28; H01R 9/22; H01R 9/16; H01R 2201/26; F16B 2200/93
USPC .......................................... 439/519, 810–814
See application file for complete search history.

(56) References Cited

U.S. PATENT DOCUMENTS

| | | | | | |
|---|---|---|---|---|---|
| 1,206,376 | A * | 11/1916 | Randall | H01R 4/34 439/809 |
| 4,927,187 | A * | 5/1990 | Sanford | F16L 35/00 285/330 |
| 7,425,144 | B2 * | 9/2008 | Bader | H01R 9/18 361/624 |
| 9,692,193 | B1 | 6/2017 | Schnorr | |
| 10,270,187 | B2 | 4/2019 | Morita et al. | |
| 10,276,948 | B1 * | 4/2019 | Scharrer | H02K 5/225 |
| 10,348,030 | B1 | 7/2019 | Lin et al. | |
| 2007/0093144 | A1 * | 4/2007 | Charrier | H02B 1/044 439/801 |
| 2007/0207652 | A1 * | 9/2007 | Tsuruta | H01R 4/30 439/166 |

* cited by examiner

*Primary Examiner* — Christopher M Koehler
*Assistant Examiner* — Gregory L Mangot
(74) *Attorney, Agent, or Firm* — Cusick IP, PLLC; Clinton J. Cusick, Esq.

(57) ABSTRACT

Apparatus for resilient electrical and mechanical connection is disclosed where a mount is configured with a central connector and at least one post. The central connector is configured to pass through an opening in a surface and engage threaded connection with a recessed nut. One or more posts are configured to pass through additional openings in the surface and engage a co-radial groove in the recessed nut that allows for tightening of the recessed nut to the mount on opposite sides of the surface while receiving the one or more posts.

15 Claims, 4 Drawing Sheets

ELECTRICAL FEED THROUGH CONNECTOR

BACKGROUND OF THE INVENTION

Field of the Invention

The present general inventive concept is directed to a feed through electrical connector with anti-rotation features.

Description of the Related Art

The prior art discloses a number of feed through or pass through connectors for making an electrical connection to a power source. Most of the connection devices of the prior art are large and rely on a cover plate of substantial size to be bolted to a surface and provide an interface to connect a conduit to the interface and make contact suitable for electrical current. One example is U.S. Pat. No. 10,270,187 to Morita et al. The patent describes a charging connector for electrical connection between a connection terminal and an electric cable. As shown in the drawings, the charging connector is suited for connection to a vehicle body with a large flange and four openings for bolted attachment at the corners of the flange. A specialized receptacle for a charging plug terminal is suited for insertion. The device takes up significant space across the vehicle body and is unsuited for use where a number of connections are desired. For example, in an electrical panel, a number of different electrical connections are made, and each requires space for the feed through connector.

Another device is disclosed in U.S. Pat. No. 9,692,193 to Schnorr. The patent discloses a sealed feedthrough connector with a non-conductive clamp plate. The clamp plate can be secured to a terminal panel with a wall of the electronics chassis. Again, the device relies on a large clamp plate that can be bolted to a wall. The mechanical means in which the device is attached to a structure and secured against movement is to place threated fasteners at the corners of the clamp plate and terminal panel. In FIG. 1A, six clamp fasteners are shown, three across the top and three across the bottom of the rectangular clamp plate. While the positioning is stable, the amount of space required is substantial and prevents the presence of another electrical connection within the footprint or proximate to the connection device. Utilizing significant force to secure threaded fasteners can deform or damage thin materials such as electrical panels.

What is needed is a feed through connector that comprises a small form factor, presents a small surface area, resists movement and rotation, will not damage thin panels during installation, and is non-conductive for placement near other feed though connector devices.

SUMMARY OF THE INVENTION

It is an aspect of the present invention to provide an electrical connector that requires a small footprint and provides electrical and mechanical connection through a surface or electrical panel. The above aspects can be obtained by an electrical connector comprising a mount comprising a conductive sheath with a first opening in a first direction, a second opening in a second direction, and a central connector; a mounting flange exterior to said first opening; said central connector comprising connector threads exterior to said second opening; a first post disposed on said mounting flange and extending in said second direction; a recessed nut comprising nut threads configured for threaded connection with said connector threads; and a co-radial groove disposed in said recessed nut and configured to receive said first post wherein rotation of said recessed nut establishes threaded connection with said mount.

It is a further object of the invention to provide an electrical feed through connector that interfaces with a panel or surface having openings suited to receive and restrain posts that engage a recessed nut. These objects can be provided by an electrical connector comprising a mount and a recessed nut configured for threaded attachment through a surface wherein said mount comprises a first post and a second post positioned on opposing sides of a central axis and a central connector comprising connector threads; said recessed nut comprises nut threads and a co-axial groove configured to receive said first post and said second post and allow for rotation of said recessed nut about said central axis; said surface comprises a first surface opening configured to receive said first post, a second surface opening configured to receive said second post, and a central opening configured to receive said central connector; and said recessed nut can be rotated relative to said mount to press said surface between said mount and said recessed nut to prevent relative movement of said mount relative to said surface.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
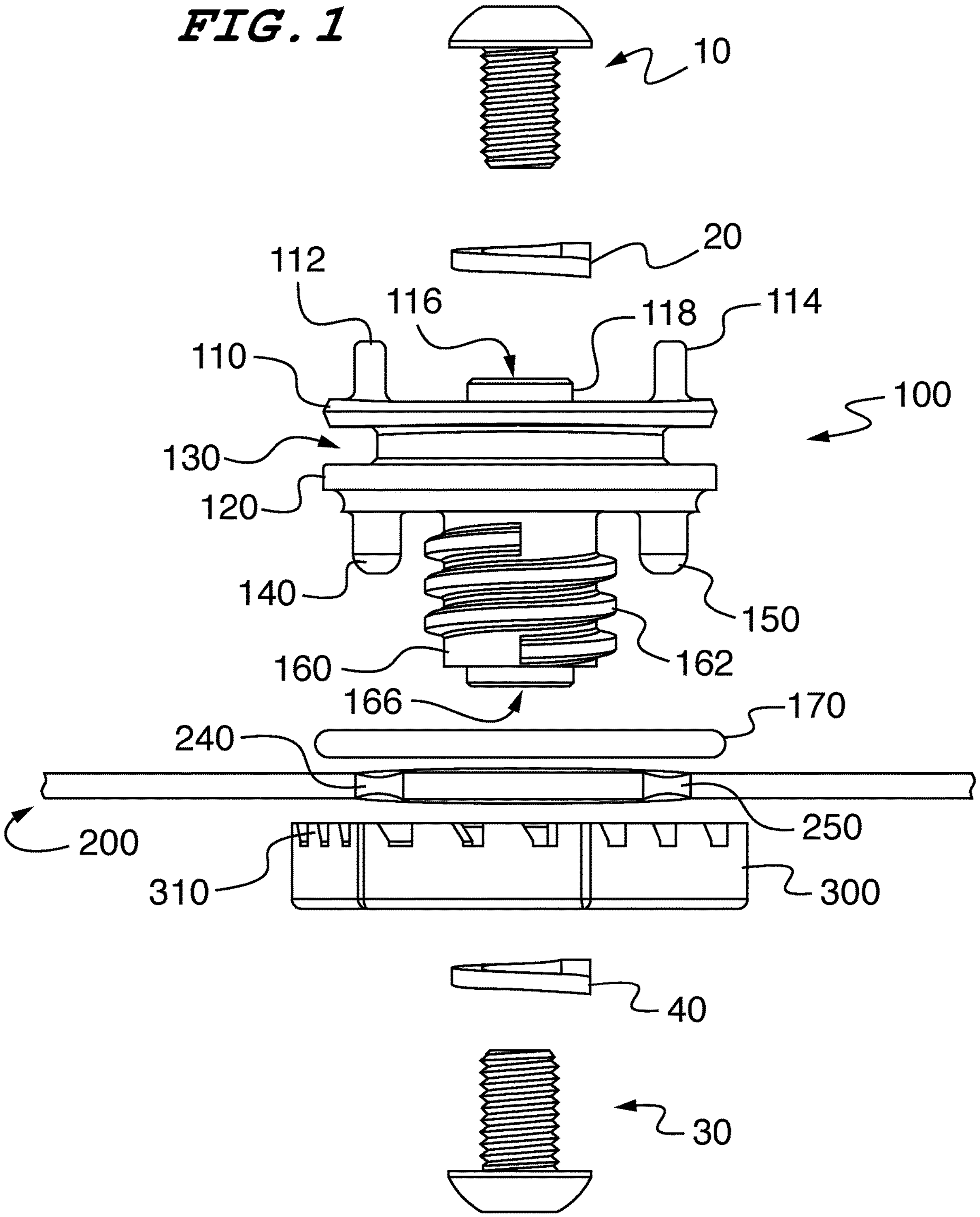
FIG. 1 is an exploded side view of a feed through connector in an embodiment of the invention.

Reference will now be made in detail to the presently preferred embodiments of the invention, examples of which are illustrated in the accompanying drawings, wherein like reference numerals refer to like elements throughout.

Figure 2:
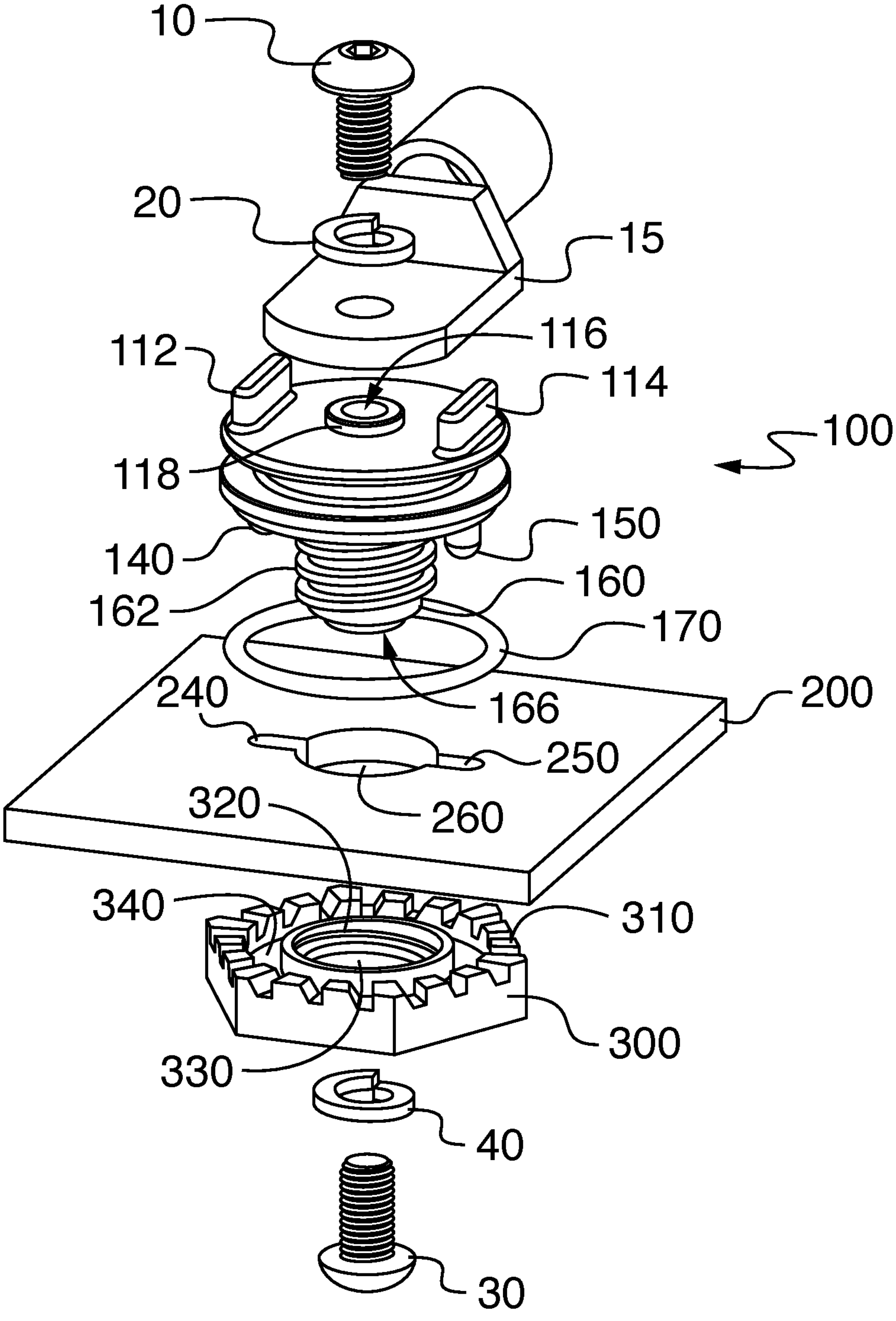
FIG. 2 is an exploded perspective view of a feed through connector in an embodiment of the invention.

The present inventive concept relates to a device that provides feed through electrical connection to a surface 200, for example an electrical panel or a battery box or lid. Surface 200 can be a conductive or non-conductive material with sufficient thickness and strength to support the device. Surface 200 should be apertured to allow passage of central connector 160 and first post 140 and second post 150. The device of the invention can function with one post such as first post 140, but in another embodiment second post 150 provides additional stability against movement or rotation. It will be understood that the addition of a third post, or additional posts, would function similarly in the spirit of the invention. In an embodiment of the invention, mount 100 comprises several features that prevent rotation and secure the position of the mount 100 relative to an electrical panel or surface 200. In an embodiment, the top of mount 100 can comprise first cable guide 112 and second cable guide 114. As shown in FIG. 2, the cable guides can help position an electrical cable 15 for electrical connection. First blind hole 116 is positioned within conductive sheath 118 that comprises interior threads in a particular embodiment. First fastener 10 is configured to be inserted into first blind hole 116 of conductive sheath 118 to secure mechanical connection and first lock washer 20 can be used to secure the connection of first fastener 10. In typical uses, an electrical cable 15 shown in FIG. 2 with an opening is positioned around first fastener 10 prior to attachment of first fastener 10 to establish a binding electrical connection with conductive sheath 118 via first blind hole 116. In the same manner, an electrical connector (not shown) can be positioned about a second fastener 30 prior to threaded connection, aided by second lock washer 40, into second blind hole 166 in conductive sheath 118. In an embodiment, first blind hole 116 is not continuous with second blind hole 166, but they are electrically connected by the continuous structure of conductive sheath 118 preferably formed of conductive material, including metal. The center of conductive sheath 118 preferably defines a central axis of the mount 100. The mount 100 can be constructed by molding a material such as plastic over a metal conductive sheath 118.

Cover flange 110 and cover recess 130 combine to retain a safety cover (not shown) that can be made of plastic, rubber, or other non-conductive material to prevent unwanted contact with first fastener 10 or electrical cable 15. Cover flange 110 extends radially to help form cover recess 130. If first fastener 10 is made of metal or conductive material, it will assist in conducting electricity to cable 15. If first fastener 10 is non-conductive, current will not flow through the fastener 10, but will be conducted from conductive sheath 118 shown protruding at the top of mount 100 to cable 15. Covering the connection with a non-conductive safety cover (not shown) reduces unwanted contact with voltage or current. Mounting flange 120 extends outward from the center of mount 100 and provides a circular structure of increased radius to retain O-ring 170 against surface 200 and provide a secure connection that is watertight and prevents leakage. In use, mounting flange 120 presses O-ring 170 against surface 200. Mounting flange 120 can comprise a concave recess to retain O-ring 170. In an alternate embodiment, a gasket or flat gasket can be utilized in place of an O-ring. Mounting flange 120 extends radially to help form cover recess 130.

Extending from said mount 100 opposite first blind hole 116 and disposed centrally is central connector 160 comprising connector threads 162. The portion of conductive sheath 118 that defines second blind hole 166 is shown protruding from central connector 160 and provides for insertion of second fastener 30 into second blind hole 166. Optionally, second lock washer 40 aids in retention of second fastener 30. Mount 100 can be securely fastened to surface 200 with the rotation of recessed nut 300 about connector threads 162 of central connector 160 to draw the mount 100 and O-ring 170 against surface 200. Recessed nut 300 preferably rotates around the central axis of mount 100 for threaded connection. Recessed nut 300 can comprise angled teeth 310 that increase retention of recessed nut 300 against surface 200. Angled teeth 310 can be slanted away from the direction of rotation for connection or tightening so that when attachment is complete, the angled teeth 310 present a sharper angle on the leading edge in the direction of rotation for loosening. In typical threading, angled teeth 310 present an oblique angle on the leading edge of clockwise rotation and a right angle or acute angle on the leading edge of counterclockwise rotation.

The present invention comprises an anti-rotation feature provided by the presence of at least one post such as first post 140 and second post 150. First post 140 is positioned away from the center of central connector 160 and conductive sheath 118. Second post 150 can be positioned on the opposite side of central connector 160 as first post 140. The posts can be positioned a sufficient distance from the central axis to prevent over-torquing damage to the panel. Where prior art connections relied on a fastener such as a threaded bolt, there was an incentive to overtighten the bolt or fastener to ensure a tight connection that would not move or shift. This pressure could warp or dent thin materials such as electrical panels. The use of a recessed nut 300 is shown as having a wider engagement than second fastener 30 and distributing force across a wider area. First post 140 is configured to interact with surface 200 and recessed nut 300 to prevent movement of mount 100. Where recessed nut 300 and mount 100 are threadedly connected through surface 200, relative movement of all parts is prevented and the mount provides a stable electrical and mechanical connection in a compact space. Mount 100 is configured to interact with surface 200 where connector opening 260 is sized to accommodate the insertion of central connector 160. Post opening 240 is spaced apart from the connector opening 260 and post opening 250 is spaced apart from the connector opening 260. The post openings can be discrete and separate, or continuous with connector opening 260 as shown in FIG. 2. The width of post opening 240 can be equivalent to the width of first post 140 with enough tolerance to ensure insertion of first post 140 into post opening 240. The width of post opening 250 can be equivalent to the width of second post 150 with enough tolerance to ensure insertion of second post 150 into post opening 250. Where the post openings are formed similarly, they can receive insertion of first post 140 or second post 150 interchangeably. Alternately post opening 240 can be keyed to first post 140 with a corresponding geometry such as a square shape to ensure that mount 100 is connected to surface 200 in a particular orientation and prevent reverse attachment. In an embodiment of the invention, central connector 160 is inserted through O-ring 170 and connector opening 260 of surface 200. First post 140 is inserted through post opening 240 and second post 150 is inserted through post opening 250. As shown in FIG. 2, the boundaries of post opening 240 constrain the movement of post 140 in at least two directions, preventing rotation of first post 140 relative surface 200 by abutting the sides of first post 140. Second post 150 is similarly constrained. The boundaries of the co-radial groove 340 are complimentary and restrain the movement of post 140 in at least two directions; the groove first side and groove second side preventing radial movement of post 140 towards or away from the axial center. In this way, the elements of the structure of the device combine to prevent movement of the mount 100 relative to the surface 200.

Recessed nut 300 comprises a threaded opening 330 with nut threads 320 for threaded connection with connector threads 162 of central connector 160 to form a secure mechanical connection between mount 100 and recessed nut 300 on opposite sides of surface 200. Recessed nut 300 comprises a co-radial groove 340 disposed within recessed nut 300. Recessed nut 300 can be molded of a non-conductive material including plastic. First post 140 and second post 150 are free to move relative to the recessed nut as the co-radial groove has an inner radius approximate to the inner side of the posts 140, 150 and an outer radius approximate to the outer side of the posts 140, 150. Recessed nut 300 can be turned and the nut threads 320 engage the connector threads 162 to draw recessed nut 300 towards mount 100, and posts 140 and 150 do not hamper rotational movement of recessed nut 300. During tightening by rotation of recessed nut 300 about central connector 160, where the posts are fee to move within the co-radial groove, they are restrained from moving relative to the surface 200 by the boundaries of post opening 240 and post opening 250 and thereby prevent movement of mount 100 relative to surface 200. Upon tightening of recessed nut 300 onto central connector 160, mount 100 and its various structural components are prevented from moving, shifting, or rotating relative to surface 200, and the entire device is secured. Electrical connection can then be accomplished as the application requires.

Posts 140 and 150 can extend from mount 100 a length approximately equal to, greater than, or less than, the width of surface 200 of an intended application. Threaded opening 330 allows for central connector 160 to protrude past recessed nut 300 as needed to snug recessed nut 300 against surface 200. Post 140 can be configured to have a length, less than, equal to, or greater than the expected surface 200 thickness. If post 140 has a length equal to the thickness of surface 200, post 140 will not occupy any of the space of co-radial groove 340. If post 140 has a length that exceeds the thickness of surface 200 by a tenth of an inch, for example, it can be expected that post 140 will extend into co-radial groove approximately one tenth of an inch. The co-radial groove 340 will require a depth of at least one tenth of an inch to enable mechanical connection and compression of mount 100 with surface 200. Typical surface 200 thicknesses for electrical panels can range from 0.025 inches to 0.156 inches. In an embodiment with post 140 comprising a length of approximately 0.16 inches and co-radial groove having a depth of 0.16 inches, a device of the invention could accommodate panel thicknesses throughout the expected range. If post 140 has a length less than the thickness of surface 200, the post will not engage co-radial groove 340 of recessed nut 300, but rotation of the device will still be restrained by the border of the post opening where it is situated. Position of mount 100 will be maintained by friction from threaded connection of recessed nut 300 to central connector 160.

Figure 3A:
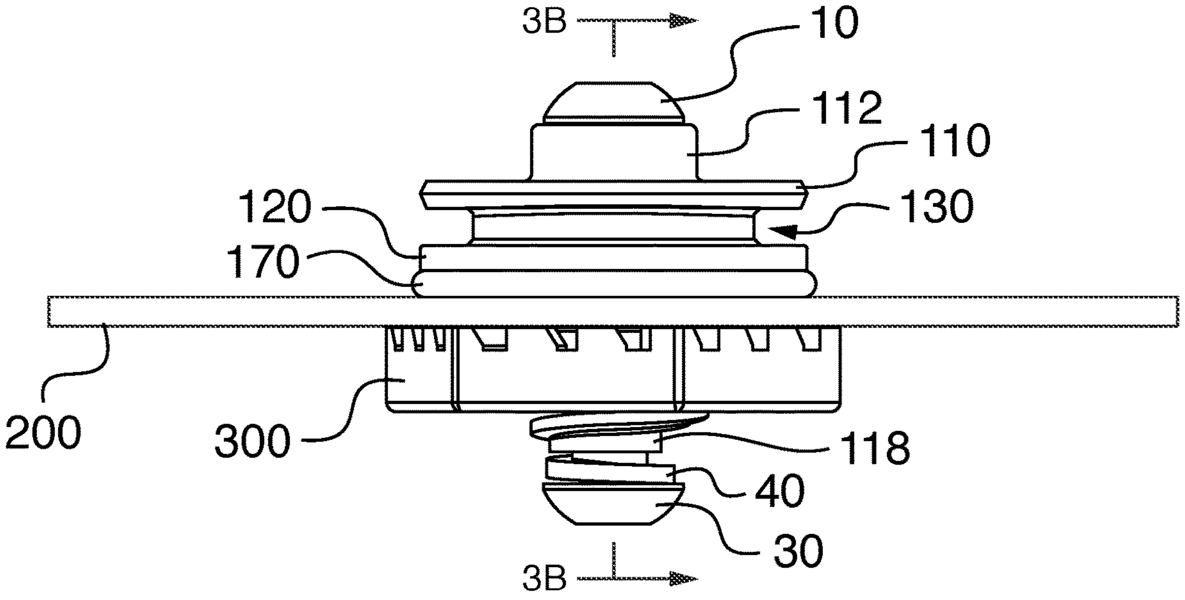
FIG. 3A is a side view of a feed through connector in an embodiment of the invention.
Figure 3B:
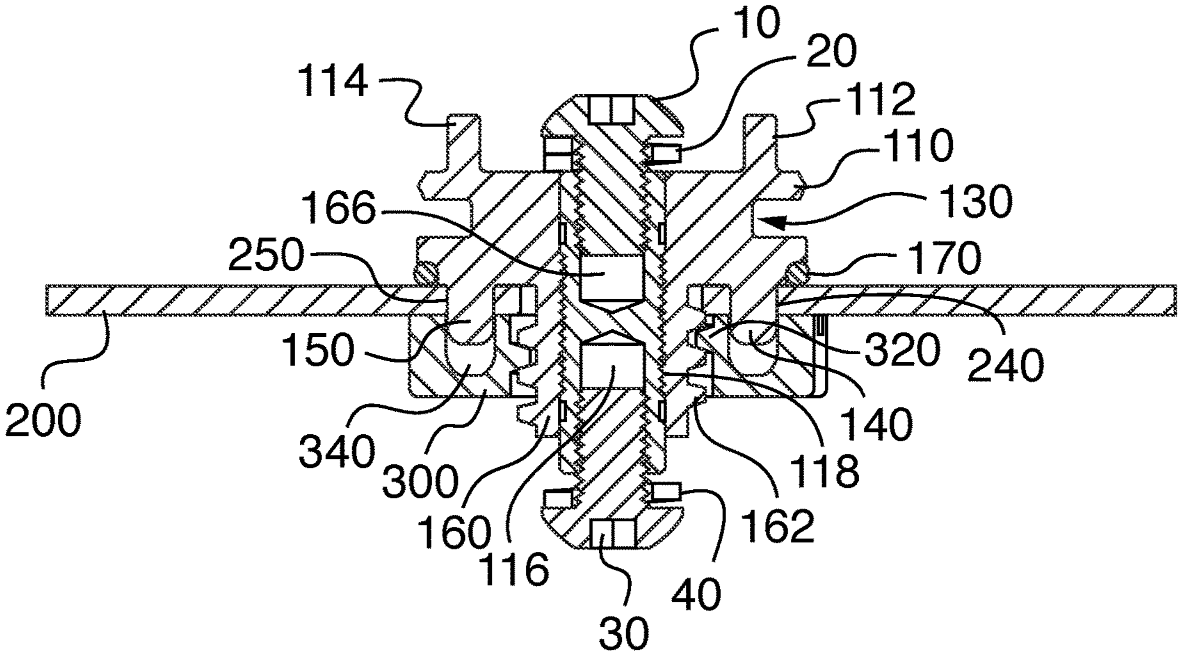
FIG. 3B is a sectional view of a feed through connector in an embodiment of the invention.

FIG. 3A and FIG. 3B present a side view and sectional view of a mount 100 and a recessed nut 300 connected to a surface 200 having a wide thickness. Portions of posts 140 and 150 are shown extending into co-radial groove 340 after the recessed nut 300 is tightened. Recessed nut 300 can be hexagonal in circumference, or comprise four sides or other configuration known in the art. As can be seen in FIG. 3B, first post 140 and second post 150 are approximately equidistant from a central axis of the mount 100. When recessed nut 300 is rotated, the position of the posts equidistant from the central axis of mount 100 allows both of the posts to engage or be received by the co-radial groove 340 of recessed nut 300. The co-radial groove 340 is configured to have the same radius and be equidistant from the central axis of mount 100 as first post 140 and second post 150. In a preferred embodiment, co-radial groove 340 has an inner radial dimension corresponding with the inner side of first post 140 and has an outer radial dimension corresponding with the outer side of first post 140. In FIG. 1, the inner side of first post 140 is closer to central connector 160 and the outer side of first post 150 is further from central connector 160. The difference between the radial dimension to the outer side and the radial dimension to the inner side measures the post width and preferably determines the width of co-radial groove 340 which can be equivalent to, or incrementally greater than, the width of first post 140. Here, incrementally greater will be understood to provide a tolerance for ease of movement where exact dimensional equality might provide unwanted friction between the posts 140, 150 and the sides of the co-radial groove 340. The radial dimensions are measured from the central axis or the equivalent axial center of mount 100. Second post 150 can be configured similarly to be received in co-radial groove 340. Co-radial groove will be understood to have a groove first side to interface with a post inner side and a groove second side to interface with a post outer side. In alternate embodiments, additional posts can be provided that engage the same co-radial groove or a second co-radial groove disposed on a recessed nut with larger dimensions. The co-radial positions are measured from the central axis.

Figure 4A:
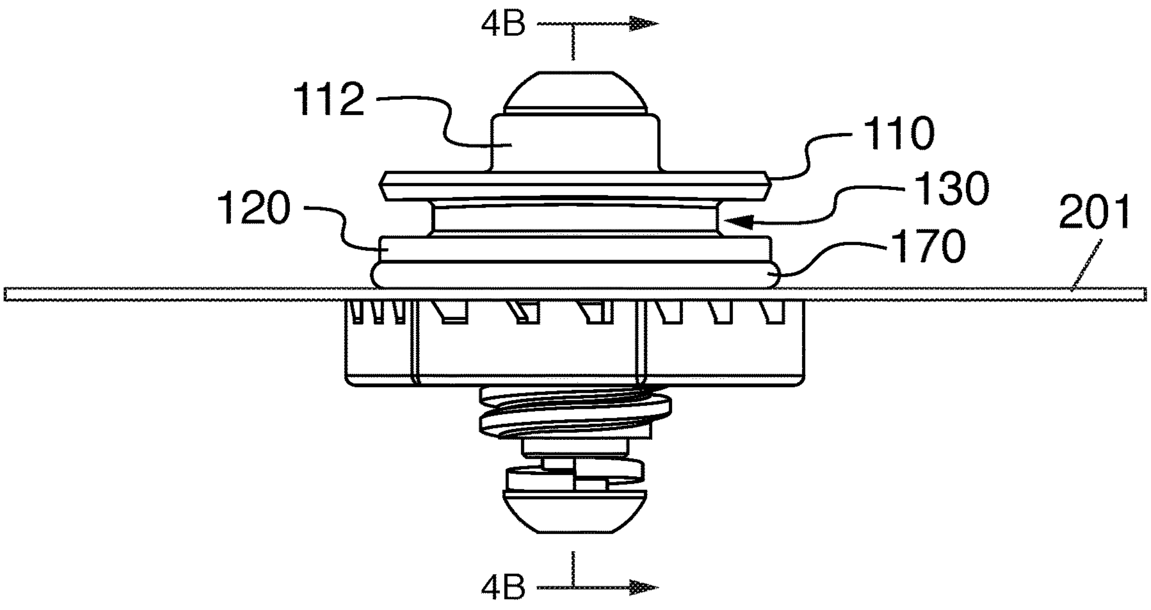
FIG. 4A is a side view of a feed through connector in an embodiment of the invention.
Figure 4B:
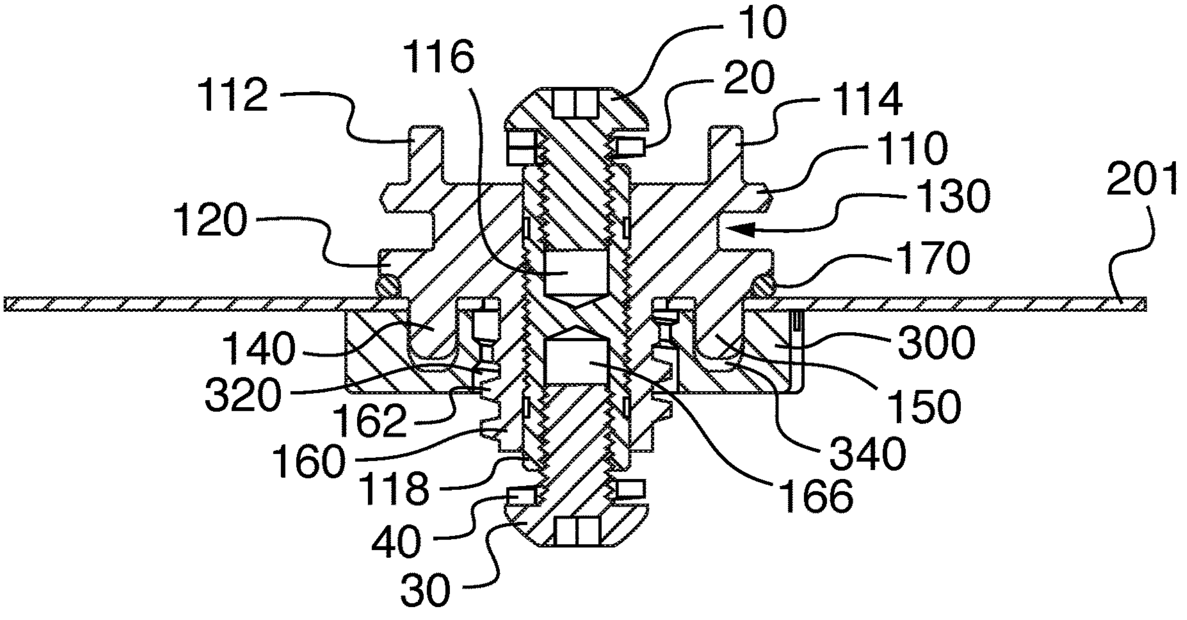
FIG. 4B is a sectional view of a feed through connector in an embodiment of the invention.

FIG. 4A and FIG. 4B present a side view and sectional view of a mount 100 and a recessed nut 300 connected to a thin surface 201. As a result of the thin surface 201, first post 140 and second post 150 extend into recessed nut 300 a greater amount and approach the bottom of co-radial groove 340. When the recessed nut 300 is tightened about central connector 160, the device of the invention provides a secure and stable mechanical connection, fixed in position, through a surface 201 that can comprise a battery box, electrical panel, or other application surface. The required depth of co-radial groove 340 can be slightly greater than the height of first post 140 minus the width of thin surface 201 to ensure accommodation and free rotation of recessed nut 300 up until friction fit is achieved. While fixed in position, the central portions of the mount 100 provide for electrical connection by conductive sheath 118 through surface 201 while preventing electrical contact or shorting with surface 201 by nature of the non-conductive posts 140, 150, central connector 160, and recessed nut 300 that physically contact surface 201; physical contact with surface 201 is made, but electrical connection is avoided.

In an alternate embodiment, not shown, one end of the device can utilize a friction fit connector instead of, for example second fastener 30. An alternate embodiment can replace second blind hole 166 which is threaded, with a straight blind hole that is a smooth opening without threads and is suited to receive a pin connector retained by friction fit. A cage connector can be employed to attach the pin connector to an electrical cable. The cage connector can be crimped to establish connection with the electrical cable. The conductive sheath 118 can comprise two blind holes that can each be threaded, or comprise a threaded blind hole and a straight blind hole, or can comprise two straight blind holes that are smooth and suited for friction fit of, for example, a pin connector. The conductive sheath 118 is numbered in the figures with the top called out in FIG. 1 and FIG. 2, the middle called out in FIG. 3*b*, and the bottom called out in FIG. 3A and FIG. 4B, pointing out different portions of the same structure.

Any description of a component or embodiment herein also includes mechanical or electrical connections and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electrical connector comprising:

a mount comprising a conductive sheath with a first opening in a first axial direction, a second opening in a second axial direction, and a central connector;

a mounting flange exterior to said first opening;

said central connector comprising connector threads exterior to said second opening;

a first post disposed on said mounting flange spaced apart in a radial direction from said central connector and extending in said second axial direction;

a recessed nut comprising nut threads configured for threaded connection with said connector threads; and a continuous co-radial groove disposed in said recessed nut, open to said first axial direction, and configured to receive said first post wherein rotation of said recessed nut establishes threaded connection with said mount.

2. The electrical connector of claim 1 further comprising a second post extending in said second axial direction where said first post is positioned equidistant, in a different radial direction, from an axial center as said second post.

3. The electrical connector of claim 2 wherein said co-radial groove comprises an inner radial dimension corresponding with an inner side of said first post and comprises an outer radial dimension corresponding with an outer side of said first post.

4. The electrical connector of claim 3 wherein said conductive sheath first opening is threaded and configured to receive a first fastener and said conductive sheath second opening is threaded and configured to receive a second fastener.

5. The electrical connector of claim 4 wherein said mount further comprises a cover flange, a first cable guide and a second cable guide.

6. The electrical connector of claim 5 wherein said conductive sheath first opening extends above said cover flange to facilitate electrical connection with an electrical cable.

7. The electrical connector of claim 6 wherein said conductive sheath second opening extends past said central connector to facilitate electrical connection.

8. The electrical connector of claim 5 wherein said mounting flange comprises a concave recess configured to retain an O-ring.

9. The electrical connector of claim 8 wherein said mount further comprises a cover recess configured to retain a non-conductive safety cover.

10. An electrical connector comprising;

a mount and a recessed nut configured for threaded attachment through a surface;

wherein said mount comprises a first post and a second post positioned on opposing sides of a central axis and a central connector comprising connector threads;

said recessed nut comprises nut threads and a co-axial groove open in a first axial direction and facing said first post and said second post and configured to receive said first post and said second post and allow for continuous rotation of said recessed nut about said central connector;

said surface comprises a first surface opening configured to receive said first post extending in a second axial direction, a second surface opening configured to receive said second post extending in said second axial direction, and a central opening configured to receive said central connector; and said recessed nut can be rotated relative to said mount to press said surface between said mount and said recessed nut to prevent movement of said mount relative to said surface.

11. The electrical connector of claim 10 wherein said first post is distant from said central axis an equivalent distance as said co-radial groove is distant from said central axis.

12. The electrical connector of claim 11 wherein said mount comprises a conductive sheath with a first threaded opening in said first axial direction and a second threaded opening in said second axial direction and co-radial groove is open towards said surface.

13. The electrical connector of claim 11 wherein said mount comprises a conductive sheath with a threaded blind hole in said first axial direction and a straight blind hole in said second axial direction.

14. The electrical connector of claim 11 wherein:

said first post comprises a first post inner side and a first post outer side;

said co-radial groove comprises a groove first side and a groove second side;

said groove first side is collocated an equivalent distance from said central axis as said first post inner side; and said groove second side is collocated an equivalent distance from said central axis as said first post outer side.

15. The electrical connector of claim 11 wherein said second post is located equidistant from said central axis as said first post.

* * * * *